June 27, 1933. S. H. LEFTWICH 1,915,938
APPARATUS FOR HUMIDIFYING AND FILTERING OR PURIFYING AIR
Filed Jan. 14, 1933
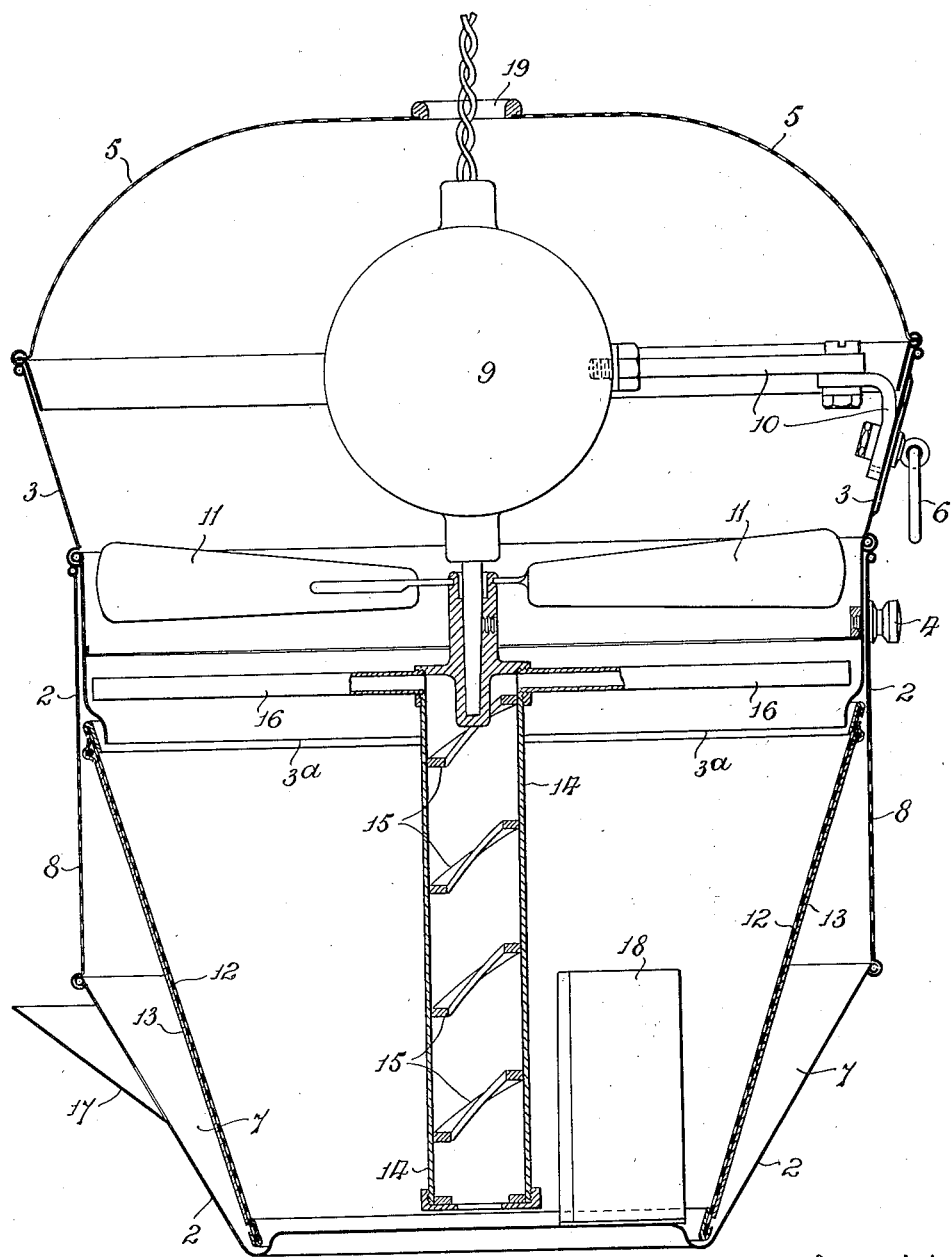

Patented June 27, 1933

1,915,938

UNITED STATES PATENT OFFICE

STANLEY HERBERT LEFTWICH, OF SUNBURY-ON-THAMES, ENGLAND

APPARATUS FOR HUMIDIFYING AND FILTERING OR PURIFYING AIR

Application filed January 14, 1933, Serial No. 651,703, and in Great Britain September 18, 1931.

This invention has reference to apparatus for humidifying and filtering or purifying air, and it has for its object to provide an improved, simple and efficient apparatus for circulating, humidifying and filtering, sterilizing or otherwise purifying the atmosphere of a room or other enclosure.

An apparatus in accordance with the invention comprises a casing provided with a liquid reservoir or container, a fan in said casing adapted to draw air from the enclosure into the casing and to discharge it from the casing back into the enclosure, a filter or pervious screen through which the air is drawn or caused to pass and means for keeping said screen wetted with liquid from said reservoir or container.

The accompanying drawing illustrates in central vertical section one form of apparatus in accordance with the invention.

Referring to the drawing, the apparatus illustrated comprises a casing consisting of a lower part 2 and an upper part 3, the lower end of which fits into the top of the part 2 and is secured thereto by means of a number of screw studs 4. The upper part 3 is provided with a perforated or reticulated cover 5 and with a number of suspension rings 6 by means of which the apparatus may be suspended by the aid of chains or cords from the ceiling of the enclosure.

The lower end of the casing part 2 is formed as a reservoir 7 for containing water to which may be added a suitable disinfectant or sterilizing agent. Above the reservoir 7 the wall of the casing part 2 is provided with a grille or perforated portion 8. In the upper casing part 3 is arranged an electric motor 9 carried by brackets 10. On the armature shaft of the motor is mounted a fan 11 adapted to draw air from the enclosure through the grille or perforated portion 8 into the casing and to discharge it therefrom through the perforated or reticulated cover 5 back into the room. Within the casing part 2 is provided an inverted conical filter screen through which the air drawn into the casing by the fan 11 passes. The filter screen conveniently consists of a frame 12 of gauze, wire netting or the like covered with filter cloth 13 or other suitable material and preferably extends to the bottom of the reservoir 7 as shown. The upper end of the frame surrounds the lower end of the casing part 3, the extremity 3ª of which is reduced in diameter to enter the top of the frame. The upper part of the filter screen through which the entering air passes is kept wetted by liquid raised from the reservoir and sprayed on to the screen by means of a lifting device rotated by the motor 9. As illustrated, this lifting device consists of a vertical tube 14 secured to the shaft of the motor and provided with an internal spiral vane or vanes 15, the lower end of the tube dipping into the liquid in the reservoir 7 and the upper end being provided with radial pipes or nozzles 16 from which the raised liquid is sprayed on to the lower end of the upper casing part 3 down which it flows to the filter cloth or other pervious material 13.

It will be apparent that impurities carried by the air drawn into the apparatus from the enclosure will be moved and retained by the filter screen as the air passes therethrough, so that only purified humidified air will be re-delivered into the enclosure. To change the filter cloth 13 it is merely necessary to remove the screws 4 whereupon the reservoir 7 and grille 8 can be lowered. The soiled or used filter cloth 13 can then be removed and replaced with a clean filter. The reservoir and grille are then raised and are secured by the screws 4.

According to a modification, the liquid raising device may consist of a spiral tube secured to the shaft of the motor 9 and having its lower end immersed in the liquid in the reservoir 7 and its upper end connected to distributing pipes extending radially and adapted to spray the liquid on to the lower end of the casing part 3 or the filter screen. When the motor is running, sufficient water should be raised so that it will just drop from the lip, thus keeping the filter cloth moist. If there is too much water, a water-screen is produced inside the filter, which retards the suction of air, and contra, if there is no water raised then the advantages of the damp filter are lost. If, by any chance, when the machine is started up there is too much water, this can be reduced by bending the fan-blades slightly up which will have the effect of slightly slowing down the motor. If, on the contrary, there is not enough water raised, then the fan-blades should be bent down slightly, thus increasing the speed and so the amount of water raised. All the blades should be equally adjusted.

The reservoir 7 may be replenished with water or other liquid by means of a filling lip 17 and for preventing swirling of the liquid in the reservoir a plurality of radial baffles 18 may project upwards from the bottom of the reservoir. The leads for conducting the current to the motor 9 may pass through an aperture 19 provided in the cover 5.

What I claim as my invention and desire to secure by Letters Patent is:—

1. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, an inverted conical filter screen positioned in said casing below the fan with its smaller end extending toward the reservoir and through which screen, air is drawn by the fan, means for keeping said screen wetted with liquid from the reservoir, comprising a pump in the casing connected to the fan for actuation therewith and having a portion immersed in the liquid in the reservoir, and liquid conducting means within the casing connected to said pump, and extending to the upper, larger end of the screen, for positively conducting liquid from the pump to said end of the screen.

2. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, an inverted conical filter screen positioned in said casing below the fan with its smaller end extending toward the reservoir and through which screen, air is drawn by the fan, means for keeping said screen wetted with liquid from the reservoir, comprising a pump in the casing connected to the fan for rotation therewith and having a portion immersed in the liquid in the reservoir, and liquid conducting means mounted on said pump within the casing for rotary movement therewith, and extending to a point adjacent the upper, larger end of the screen, effective to conduct and spray liquid from the pump toward the upper portion of the screen.

3. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, an inverted conical filter screen positioned in said casing below the fan with its smaller end extending toward the reservoir and through which screen, air is drawn by the fan, means for keeping said screen wetted with liquid from the reservoir, comprising a vertical tube connected to the fan for rotation therewith, said tube having an internal spiral vane, the lower end of the tube being immersed in the liquid in the reservoir and the upper end being provided with a radially extending pipe or nozzle from which liquid raised by the vane is conducted to and delivered on the screen.

4. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, a portion of the casing wall between the fan and the reservoir being perforated to form a screen for air entering the casing, an inverted conical filter screen positioned in said casing below the fan with its smaller end extending toward the reservoir and its larger end extending across said perforated wall portion, and through which screen, air is drawn by the fan, a filter cloth carried by said screen and substantially covering the entire screen body thereof, means for keeping said screen and filter cloth wetted with liquid from the reservoir, comprising a pump in the casing connected to the fan for actuation therewith and having a portion immersed in the liquid in the reservoir, and liquid conducting means within the casing connected to said pump, and extending to the upper, larger end of the screen, for positively conducting liquid from the pump to said end of the screen.

5. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, a filter screen positioned in the casing below said fan and having its lower end disposed in the reservoir, deflecting and guiding means for directing the liquid to the upper end portion of the screen, means for raising liquid from the reservoir, and means for conducting the liquid to said deflecting and guiding means.

6. The improved apparatus for humidifying and purifying the atmosphere of a room or other enclosure, comprising a casing provided with a liquid reservoir in its lower portion, a fan in said casing above said reservoir and effective to draw air into the casing and to discharge it therefrom, an inverted conical filter screen positioned in the casing below said fan and having its lower end disposed in the reservoir, deflecting and guiding means for directing the liquid to the upper end portion of the inner surface of the screen, means for raising liquid from the reservor, and means for conducting the liquid to said deflecting and guiding means.

In witness whereof I have hereunto set my hand.

STANLEY HERBERT LEFTWICH.